United States Patent [19]

Muscoplat

[11] 4,405,228

[45] Sep. 20, 1983

[54] CARD NEGATIVE HOLDER AND METHOD OF MANUFACTURE

[76] Inventor: Richard D. Muscoplat, 1435 Quebec Ave. North, Golden Valley, Minn. 55427

[21] Appl. No.: 273,471

[22] Filed: Jun. 15, 1981

[51] Int. Cl.³ ........................ G03B 27/62; A47G 1/06; G09F 1/10

[52] U.S. Cl. .................................... 355/75; 40/158 B; 353/120; 354/292; 355/122

[58] Field of Search .................. 355/75, 122; 353/120; 354/292; 40/152, 158 R, 158 B

[56] References Cited

U.S. PATENT DOCUMENTS

| | | | |
|---|---|---|---|
| 2,186,827 | 1/1940 | Engel | 40/152 |
| 2,338,189 | 1/1944 | Libby et al. | 40/152 |
| 3,814,518 | 6/1974 | Wichers | 355/75 |
| 4,132,480 | 1/1979 | Reed | 355/75 |

*Primary Examiner*—Richard A. Wintercorn

*Attorney, Agent, or Firm*—Merchant, Gould, Smith, Edell, Welter & Schmidt

[57] ABSTRACT

A card negative holder (10) and method of manufacture thereof is disclosed. Card holder (10) is comprised of a flat member (12) with pressure-sensitive stock (14) adhesively fastened to one side of flat member (12). The stock (14) is slit to allow insertion of negative (16). With plasticized covering paper (32) removed from stock (14), adhesive-backed sheet (30) may be pressed against flat member (12) to hold negative (16) between flat member (12) and stock (14).

Card holder (10) is manufactured by a flexographic process wherein both sides of flat member (12) are printed. Pressure-sensitive stock (14) is laminated to the material (58) of which flat members (12) are made. Detail features are cut in the composite lamination (54) before a final transverse cut is made to create finished product mounting cards (10).

6 Claims, 7 Drawing Figures

CARD NEGATIVE HOLDER AND METHOD OF MANUFACTURE

TECHNICAL FIELD

This invention relates to a holder for a photographic negative and the method for manufacturing the holder. Rather than simply adhering a negative to the back of a holder thereby exposing loose edges, the present invention is suitable for use in automatic processing machines since all edges of a negative are covered. The process for manufacturing the holder includes flexographic printing and other discrete laminating and cutting steps to rapidly and repetitively produce an end product.

BACKGROUND OF THE INVENTION

Card holders for photographic negatives are known. Commonly, a rectangular card having a rectangular opening therein is used. One or more circular or other shaped openings, notches or edges of the card serve to register the rectangular opening relative to the optical path of light used for developing a print from the negative. The card holder commonly includes cropping lines printed on the front of the card. The negative is positioned in the rectangular opening such that the picture to be printed appears between the appropriate cropping lines. When the negative is located, a plurality of short pieces of masking tape are extended between the back of the negative and the back of the card holder to secure the negative in place.

Card holders for photographic negatives are particularly useful with respect to annual photograph packages for school children. The market is large. Usually a number of prints of different sizes is required per child. The industry is developing machines which rapidly use a negative held by a card holder to make the several appropriate prints. The present mechanisms for holding a photographic negative to a card holder allow exposed edges of the negative to catch in parts of the processing machines. The industry has been unable to develop an easily manufactured replacement.

SUMMARY OF THE INVENTION

The present invention is directed to a mounting card for holding a photographic negative having base and emulsion sides, top and bottom edges, and opposite side edges. The mounting card includes a flat member having top and bottom edges with a length therebetween and a pair of opposite side edges. The flat member has a window through which the negative may be exposed. The mounting card further includes means for holding the negative to the flat member so the negative may be exposed through the window. The holding means has top and bottom edges and opposite side edges. The holding means is fastened to the flat member along its length so the top and bottom edges of the flat member and the holding means are flush. The holding means extends across the top edge of the negative. In this manner, the mounting card has no exposed catchable edges following the common top edge of the flat member and the holding means which could catch during passage through an automatic photographic processing machine.

In a preferred embodiment, the mounting card is comprised of a rectangular cardboard, flat member and pressure-sensitive stock having an adhesive-backed sheet with a plasticised cover protecting the adhesive. The pressure-sensitive stock extends between the top and bottom edges of the flat member. A strip of the plasticised paper is removed from both side edges of the adhesive-backed sheet, allowing it to adhere to the flat member along those strips. The pressure-sensitive stock is slit from top to bottom midway between its side edges. A rectangular opening for showing the negative passes between both the flat member and the pressure-sensitive stock. The slit in the stock is centered on the opening. Cropping lines are printed on both the front and back sides of the cardboard flat member.

The plasticised paper is slit from top to bottom inwardly from the side strips which fasten the pressure-sensitive stock to the flat member, the slit being along a direction substantially parallel with the side edges. A negative is fastened to the mounting card in the location over the opening and between the back side of the flat member and the adhesive side of the adhesive-backed sheet. The negative is aligned as desired with respect to the cropping lines such that the emulsion side is facing through the opening in the flat member. The plasticised paper is peeled from the adhesive-backed sheet of the pressure-sensitive stock in the regions between the slits in the plasticised paper and the slit in the stock. Both sides of the sheet are pressed against the negative and against the flat member thereby causing the adhesive to adhere to both. In this fashion, the sheet covers all edges of the negative and, thus, eliminates all transverse edges between the top and bottom of the mounting card. As a result, there are no edges which may catch and jam in an automatic processing machine.

Since the negative is aligned with respect to the opening and exposed by light passing through the opening, it is critical that the opening, the printed cropping lines, and the stock all be aligned properly on the flat member. The process of the present invention advantageously assures the proper alignment in a production line fashion.

The process for manufacturing a mounting card in accordance with the present invention comprise a number of steps. First a repetitive pattern is printed on the continuous cardboard material proceeding from a roll. Preferably, a pattern including cropping lines is printed on both sides of the material. Each pattern has a substantially identical length. Pressure-sensitive stock is next prepared for lamination to the printed material. The stock passes through a backslitter which makes the appropriate longitudinal slits in the plasticised paper without cutting the adhesive-backed sheet. The edges of the plasticised paper are stripped from the sheet. The pressure-sensitive stock is then laminated to the printed material so that the edges of the stock adhere. A repetitive pattern of features including a rectangular opening is then cut in the composite comprised of the printed material and the pressure-backed stock. Finally the composite is transversely cut to length wherein each length includes the printed and cut patterns.

The process advantageously eliminates critical alignment problems and provides substantially identical, discrete mounting cards from continuous rolls of raw materials.

These advantages and other objects obtained by the use of the present invention may be better understood by reference to the drawings which form a further part hereof, and to the accompanying descriptive matter in which there is illustrated and described a preferred embodiment of the invention.

DETAILED DESCRIPTION OF THE INVENTION

Figure 1:
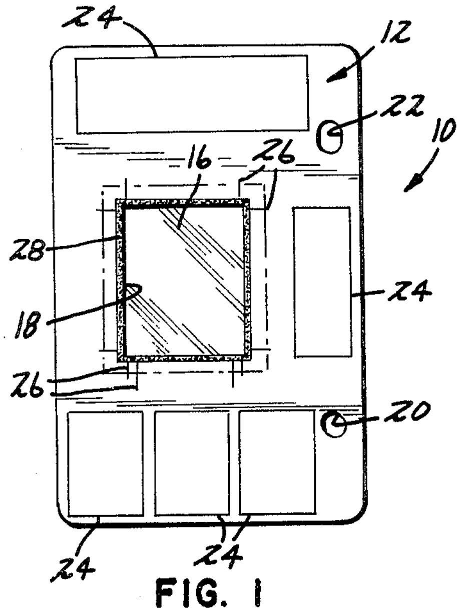
FIG. 1 is a front, plan view of a mounting card in accordance with the present invention.

Referring now to the drawings wherein like reference numerals designate identical or corresponding parts throughout the several view, and more particularly to FIG. 1, a mounting card in accordance with the present invention is designated generally by the numeral 10. Mounting card 10 is comprised of a cardboard, flat member 12 and pressure-sensitive stock 14, adhesively attached along the sides thereto. Photographic negative 16 is retained between stock 14 and flat member 12.

Flat member 12 is preferably made from a light cardboard material. It is rectangular with arcuately-shaped corners to prevent catching and bending. A rectangular opening 18 is formed in member 12 of a size appropriate for use with a particular film. The size is easily relatable to the film by one skilled in the art. In FIG. 1, circular opening 20 and oval opening 22 are also shown. Openings 20 and 22 are precisely located relative to opening 18. Openings 20 and 22 are used in a processing machine to register mounting card 10 thereby properly aligning opening 18 relative to the optical and printing equipment. Other mechanisms for registering mounting card 10 are known and include notches or the use of one or more edges of a member like flat member 12. Blocks 24 simply indicate regions on the front of flat member 12 which may contain printed matter. Cropping lines 26 are used by a photographer to align the subject matter on negative 16 in an artistic fashion. Borderline 28 has width and is a dark color to reduce reflection of light to the detriment of a processing print.

Figure 2:
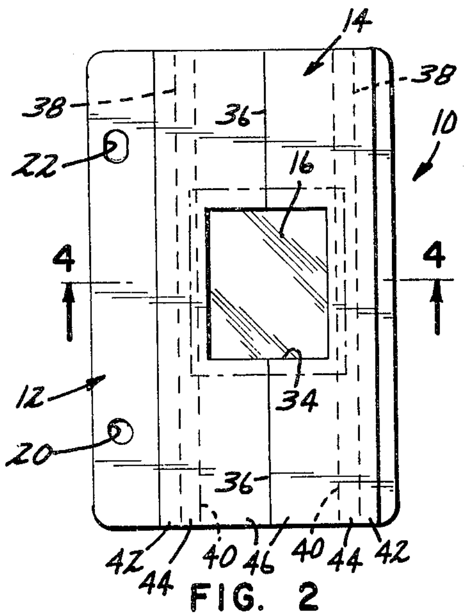
FIG. 2 is a back, plan view of the card in FIG. 1.
Figure 3:
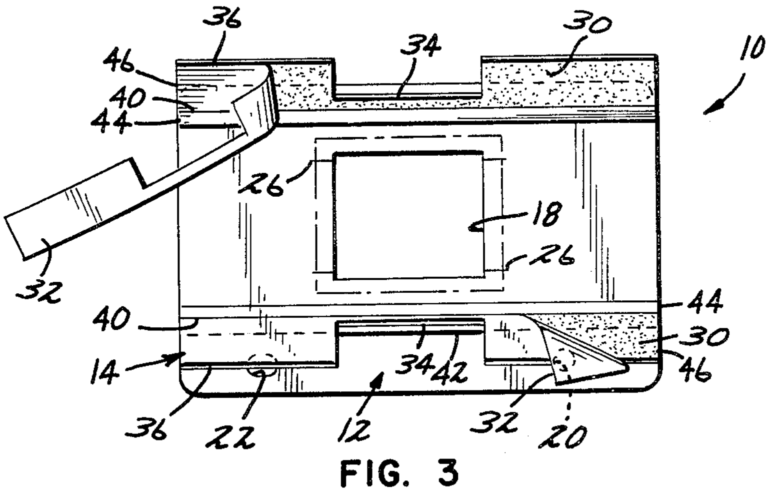
FIG. 3 is similar to FIG. 2 except it shows the two sides of the pressure-sensitive stock turned upwardly with portions of the plasticised paper removed.
Figure 4:
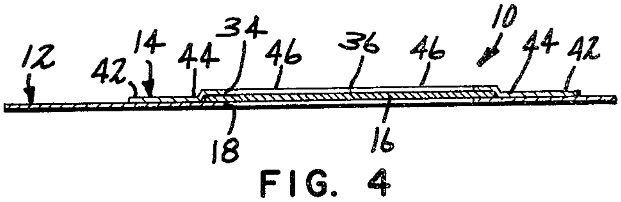
FIG. 4 is a cross-sectional view taken along line 4—4 of FIG. 2.

As shown in FIGS. 2 and 3, stock 14 is comprised of an adhesive backed sheet 30 protected by a cover 32. Stock 14 extends from the top edge of flat member 12 to its bottom edge. The side edges of stock 14 do not extend to the side edges of flat member 12. The relationship between stock 14 and flat member 12 reflects the need to eliminate transverse edges on the back of mounting card 10, while recognizing that longitudinal edges are not of particular concern with respect to the automatic processing equipment. The relationship between stock 14 and flat member 12 also avoids exact alignment of longitudinal edges, thus relaxing any precision requirement in the flexographic manufacturing process of mounting cards 10.

Stock 14 has a rectangular opening 34 identical in size to opening 18 in flat member 12. Openings 18 and 34 are aligned with one another and a slit 36 extends longitudinally from the top edge of stock 14 to its bottom edge so as to contact opening 34 at its middle.

Paper 32, covering the adhesive on sheet 30, extends from both sides of slit 36 in stock 14 to a short distance from the side edges of sheet 30. Paper 32 has longitudinal slits 40 between its side edges 38 and the side edges of opening 34. Thus, edges 38 and slits 40 define three regions 42, 44 and 46 of each half of stock 14. As indicated, region 42 adhesively fastens stock 14 to flat member 12. The plasticised paper 32 of region 46 is removable as indicated in FIG. 3 to allow sheet 30 to adhesively hold negative 16 to flat member 12. The adhesive of sheet 30 makes contact with the base of negative 16 along a portion of all four sides of negative 16. Since the adhesive contacts the base, there is no degradation of the emulsion even if negative 16 is later removed from mounting card 10. The plasticised paper 32 in region 44 is not intended for removal. Slit 40 aids in allowing a user to bend a corner of plasticised paper 32 from region 46 in order to grasp and remove it. Region 44 also separates regions 42 and 46 so that sheet 30 in the area of region 46 may be lifted as required without effecting the adhesive bond in region 42.

To use mounting card 10, stock 14 is bent away from flat member 12 as indicated in FIG. 3. This causes inside corners of paper 32 near slit 40 to pull away from the adhesive on sheet 30. Papers 32 in regions 46 may then be removed. Negative 16 is placed emulsion side downwardly over opening 18. Negative 16 is positioned with respect to cropping lines 26. Sheet 30 is then pressed onto negative 16 and flat member 12 to adhesively hold it relative to cropping lines 26. As shown in FIG. 2, all sides of negative 16 are firmly held to flat member 12, and no transverse edges exist which may be caught in an automatic processing machine.

Figure 5:
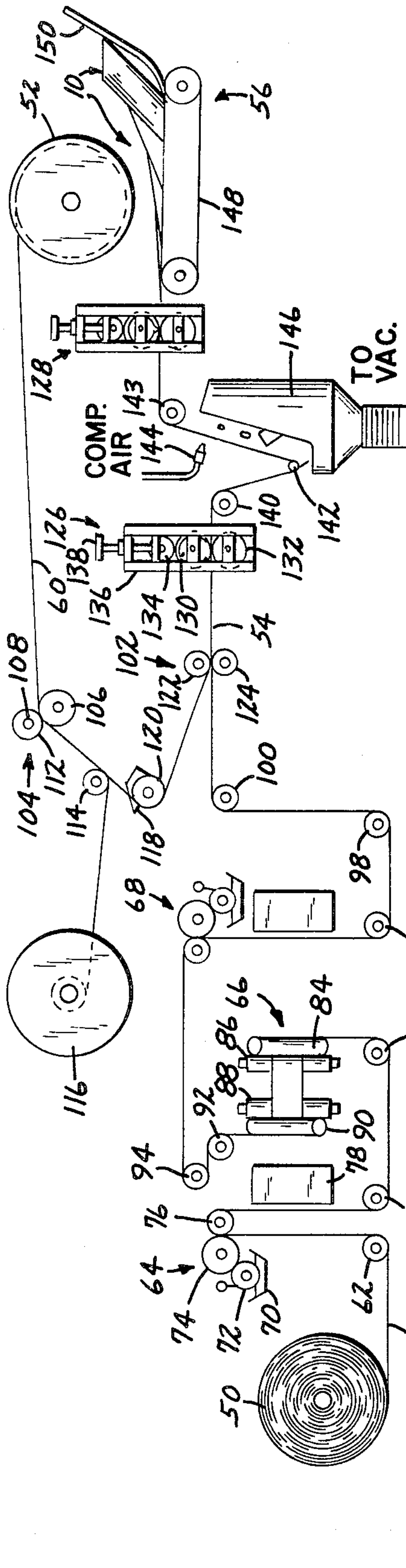
FIG. 5 is an illustration of the process for manufacturing a mounting card in accordance with the present invention.

Mounting cards 10 are manufactured using flexographic printing technology. As shown in FIG. 5, cardboard material feed roll 50 allows material to be pulled therefrom and operated on by printing stations before being laminated with pressure-sensitive stock 14 coming from a feed roll 52. The laminated composite 54 is operated thereon by various cutting stations to create the final mounting card product 10 in stacking device 56.

By using flexographic technology, the present invention advantageously reveals a process for continuously preparing material 58, which becomes flat members 12, and stock 60, which is the adhesive-backed sheet 30 protected by plasticised paper covering 32, for lamination and final cutting to form mounting cards 10. It is to be understood that although FIG. 5 illustrates one way for accomplishing the manufacturing process, other apparatus and sequence of steps is possible and fully contemplated within the scope of the process.

Figure 6:
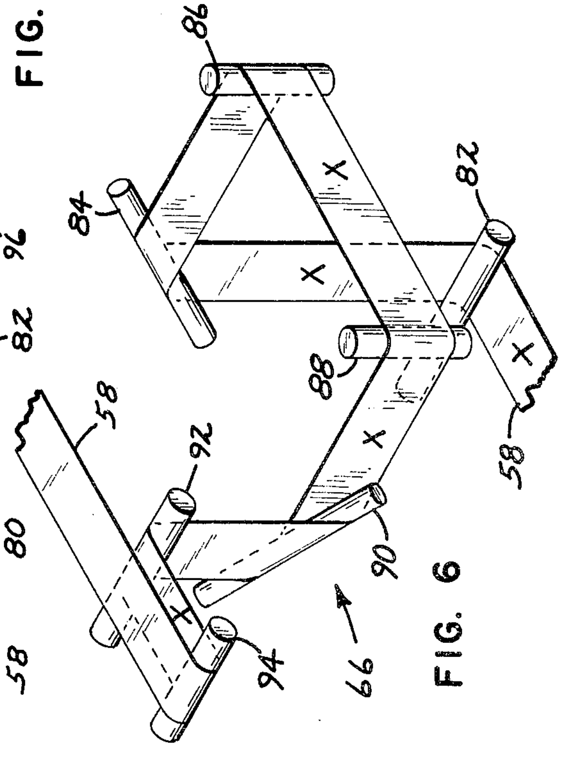
FIG. 6 is a detailed illustration showing the continuous material being flipped.

In the illustrated embodiment of the process, material 58 passes from feed roll 50 to change direction at idler roller 62. Material 58 first travels through a first printing station 64, a flipping station 66 and a second printing station 68. Print stations 64 and 68 are commonly known to those skilled in the art and may comprise the indicated elements or some other combination. For example, as shown, print station 64 includes a coating pan 70 with ink therein. A fountain roller 72 picks up ink from pan 70 and applies it to coating cylinder 74. As material 58 moves between coating cylinder 74 and impression cylinder 76, appropriate printing on one side of material 58 results. Material 58 then passes a drying station 78 to set the ink and prevent it from running. Another idler roller 80 causes material 58 to change directions and proceed to flipping station 66 as shown in illustrated detail in FIG. 6.

The "X" shows one side of the material 58 as it passes around the various idler rollers to illustrate that material 58 enters flipping station 66 with its "X" side upwardly and exits flipping station 66 with its "X" side downwardly. Material 58 travels horizontally to idler roller 82 whereupon it changes to a vertical direction. An idler roller 84 oriented 45 degrees with respect to roller 82 causes material 58 to move away from the plane in which it has otherwise been moving. Vertically oriented idler rollers 86 and 88 allow material 58 to move rearwardly toward feed roller 50 and then back inwardly. Another 45 degree oriented roller 90 causes material 58 to move upwardly in the plane of feed roll 50. Roller 90 is oriented 90 degrees with respect to roller 84. Material 58 then passes upwardly over roller 92 and continues rearwardly to direction changing roller 94 whereupon it travels forwardly in a flipped orientation with respect to its orientation before contacting roller 82.

As indicated, material 58 has the "X" side upwardly as it enters flipping station 66. After passing around roller 82, the "X" side is rearwardly. Roller 84 causes the "X" side to show forwardly. After roller 86, the "X" side is outwardly as viewed from the side of the processing machine. Roller 88 causes the "X" side to show upwardly while roller 90 causes it to show forwardly. Material 58 is traveling rearwardly with its "X" side upwardly after passing about roller 92. Roller 94 causes material 58 to make a 180 degree change of direction thereby returning it to a forwardly direction with its "X" side downwardly, thus flipped from the orientation it had when entering flipping station 66. Material 58 now moves to second printing station 68 for being printed on its second side in a manner as described hereinbefore with respect to printing station 64.

Upon leaving printing station 68, material 58 travels about idler rollers 96, 98 and 100 to position it properly for laminating station 102.

Figure 7:
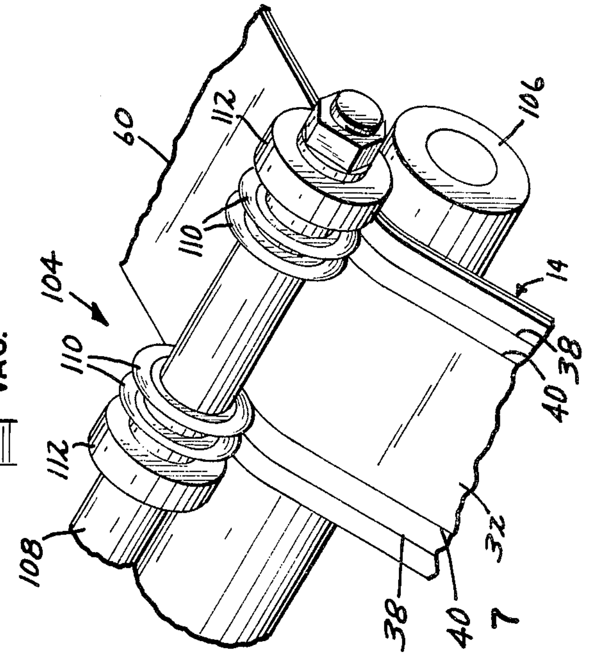
FIG. 7 is a detailed illustration showing the back slitting of the plasticised paper covering the adhesive-backed sheet.

Pressure-sensitive stock 60 is contained on a continuous feed roll 52 for preparation to be laminated at station 102. Stock 60 travels from feed roll 52 to a cutting station 104 as shown in greater illustrative detail in FIG. 7. Sheeting 60 passes between anvil roller 106 and shaft 108 having backslitters 110 thereon. Backslitters 110 have knife edges and roll continuously to slit plasticised paper 32 so as to provide what have been indentified as longitudinal slits 38 and side edges 40. Spacer wheels 112 are mounted on shaft 108 and roll on anvil roller 106. Backslitters 110 have a precisely determined diameter less than spacers 112 so that backslitters 110 slit only plasticised paper 32 and not adhesive-backed sheeting 30.

The outer strips of plasticised paper 32 are separated from sheeting 30 at roller 114 and are directed to takeup roller 116. Pressure-sensitive stock 60 continues past roller 114 to stationary knife 118 which causes the slit 36 in final product mounting card 10. After passing about roller 120, materials 58 and 60 are laminated between press rollers 122 and 124 at laminating station 102.

Composite material 54 next passes through a pair of different die cutting stations 126 and 128 before stacking as final product at stacking station 56. Although the die cutting stations may have any of various configurations as known to those skilled in the art, an illustrative station as at 126 shows a die cylinder 130 being forced against an anvil roller 132 by a pressure cylinder 134. All cylinders 130–134 are held by frame 136 which includes pressure applying device 138 for regulating pressure cylinder 134.

At die cutting station 126, rectangular openings 18 and 34, circular opening 20 and oval opening 22 are formed for final product mounting cards 10. Composite 54 then passes about idler rollers 140, 142 and 143 in such a fashion as to bring composite 54 between a compressed air nozzle 144 and a vacuum nozzle 146 for removal of waste cutouts. Composite 54 then enters second die cutting station 128 which simply makes transverse cuts thereby separating the continuous composite material 54 into discrete final product mounting cards 10. Mounting cards 10 commonly fall onto a conveyor 148 for stacking against a wall 150.

Thus, the process for manufacturing mounting cards 10 includes steps of printing a repetitive pattern on a continuous material with such patterns having a substantially identical length; laminating a pressure sensitive material to one side of the printed material to create a continuous composite; cutting a repetitive pattern of features in the continuous composite; and cutting the composite transversely to length thereby creating continual discrete mounting cards 10. The printing step advantageously may include the printing of a first repetitive pattern on a first side of material 58, a flipping of material 58, and the printing of a second repetitive pattern on the second side of material 58. The process may further include the cutting of the plasticised paper 32 which commonly covers the adhesive on sheeting 30 of a print pressure sensitive material and stripping the waste before laminating the pressure sensitive material to the cardboard material.

Although the foregoing description has given numerous characteristics and advantages of the present invention, together with details of the structure, function and process steps, it is to be understood that the disclosure is illustrative only. Any changes made, especially in matters of shape, size, arrangement and order of process steps, to the full extent extended by the general meaning of the terms in which the appended claims are expressed, are within the principle of the invention.

What is claimed is:

1. A mounting card for holding a photographic negative, said negative having base and emulsion sides, top and bottom edges, and opposite side edges, said mounting card comprising:
   - a flat member having top and bottom edges with a length therebetween and a pair of opposite side edges, said member further having first and second sides and a window through which said negative may be exposed;
   - means for holding said negative to said flat member so said negative may be exposed through said window, said holding means having a top edge,
   - said holding means being attached to the first side of said flat member near the pair of opposite side edges, said holding means including means for eliminating exposed edges between the top edge of said negative and the top edge of said flat member;
   - whereby said mounting card may include printed matter on the second side of said flat member and near the window on the first side of said flat member, said eliminating means preventing such mounting card from catching in an automatic processing machine.

2. A mounting card in accordance with claim 1 wherein said eliminating means includes a sheet adhesively held to said flat member and the base side of said negative.

3. A mounting card for holding a photographic negative, said negative having base and emulsion sides, top and bottom edges, and opposite side edges, said mounting card comprising:

a flat member having top and bottom edges with a length therebetween and a pair of opposite side edges, said member further having a window through which said negative may be exposed;

means for holding said negative to said flat member so said negative may be exposed through said window, said holding means having top and bottom edges and opposite side edges, said holding means being fastened so the top and bottom edges of said flat member and said holding means are flush, said holding means including a flexible sheet adhesively fastened adjacent both its side edges to said flat member, said sheet being slit from its top edge to its bottom edge for receiving between said side edges said negative, said sheet having first and second sides, said first side having adhesive applied thereto with a removable cover thereover, said cover having top and bottom edges with a slit extending therebetween, thereby allowing a portion of said cover to be removed, whereby said mounting card has no exposed catchable edges following said common top edge of said flat member and said holding means to catch during passage through an automatic photographic processing machine.

4. A mounting card in accordance with claim 1 wherein said flat member has opposite sides and ink in the form of lines applied to both said sides, said lines of ink being used for alignment of said negative relative to the opening in said flat member.

5. A mounting card for holding a photographic negative, said negative having base and emulsion sides, top and bottom edges, and opposite side edges, said mounting card comprising:

a flat member having top and bottom edges with a length therebetween and a pair of opposite side edges, said member further having a window through which said negative may be exposed, said member including means for registering said member with respect to said opening, said member having ink in the form of lines applied to both said sides of said member for alignment of said negative relative to said opening;

a flexible sheet having adhesive on one side with a protective cover thereover, said sheet having top, bottom and opposite side edges, said cover for said sheet having a plurality of slits extending between said top and bottom edges, said sheet having an opening identical in size with the opening in said flat member, said sheet being fastened adhesively along its side edges to said flat member such that the opening in said sheet matches the opening in said member, said sheet having a slit centered between its side edges, whereby said negative may be inserted through the slit in said sheet and aligned with the opening in said flat member by observing the ink lines, said negative being held in place by removal of portions of said cover and pressing said adhesive covered sheet against said negative and said flat member.

6. A process for mounting a photographic negative comprising the steps of:

bending a pair of adhesive-backed sheets away from opposite sides of an opening in a flat member;

inserting said negative between said pair of sheets and locating it with respect to cropping lines on said flat member;

removing coverings from the adhesive on said sheets;

pressing said sheets against said negative and said flat members to adhesively hold said negative in the selected location.

* * * * *